(12) United States Patent
Miao

(10) Patent No.: US 10,880,530 B2
(45) Date of Patent: *Dec. 29, 2020

(54) PROJECTOR AND BRIGHTNESS ADJUSTING METHOD

(71) Applicant: Coretronic Corporation, Hsin-Chu (TW)

(72) Inventor: Yun-Lin Miao, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/698,961

(22) Filed: Nov. 28, 2019

(65) Prior Publication Data

US 2020/0177854 A1 Jun. 4, 2020

(30) Foreign Application Priority Data

Nov. 30, 2018 (CN) .......................... 2018 1 1454301

(51) Int. Cl.
*H04N 9/31* (2006.01)

(52) U.S. Cl.
CPC ......... *H04N 9/3182* (2013.01); *H04N 9/3185* (2013.01); *H04N 9/3194* (2013.01)

(58) Field of Classification Search
CPC ........ G03B 21/14; H04N 9/31; H04N 9/3194; H04N 9/3155; H04N 9/3182; G09G 2320/0626

See application file for complete search history.

(56) References Cited

U.S. PATENT DOCUMENTS

| 5,483,299 | A | * | 1/1996 | Minoura | H04N 5/7441 348/191 |
| 6,634,757 | B2 | * | 10/2003 | Asakawa | H04N 5/74 348/E17.005 |
| 7,278,744 | B2 | * | 10/2007 | Nonaka | H04N 9/3114 348/744 |
| 7,300,160 | B2 | * | 11/2007 | Nakamura | H04N 5/74 348/E5.12 |
| 7,545,937 | B2 | * | 6/2009 | Rumreich | H04N 9/45 331/17 |
| 7,614,753 | B2 | * | 11/2009 | Zavarehi | G03B 21/20 353/85 |

(Continued)

FOREIGN PATENT DOCUMENTS

CN 1991571 7/2007

*Primary Examiner* — Brian P Yenke
(74) *Attorney, Agent, or Firm* — JCIPRNET

(57) ABSTRACT

A projector and a brightness adjusting method are provided. The projector includes a distance sensor configured to detect a distance between the projector and a projection plane, a light source, a brightness controlling circuit, and a processor. The light source is configured to provide an illumination beam. The brightness controlling circuit is configured to control the light source. The processor calculates according to the distance to obtain an image size of a projected image on the projection plane and instructs the light source to adjust a luminous flux of the illumination beam according to the image size of the projected image for generating a target brightness value of the projected image. Here, the brightness of the projector is adjusted and maintained to allow users to comfortably watch images with proper brightness.

14 Claims, 3 Drawing Sheets

(56) References Cited

U.S. PATENT DOCUMENTS

| | | | |
|---|---|---|---|
| 7,866,823 B2* | 1/2011 | Asai | G03B 21/142 |
| | | | 353/101 |
| 8,506,093 B2* | 8/2013 | Kato | G03B 21/53 |
| | | | 353/101 |
| 8,801,194 B2* | 8/2014 | Nakayama | G03B 29/00 |
| | | | 353/85 |
| 9,004,698 B2* | 4/2015 | Kilcher | G02B 26/0833 |
| | | | 353/69 |
| 9,215,431 B2* | 12/2015 | Nakashin | G09G 5/10 |
| 9,299,321 B2 | 3/2016 | Ohno | |
| 9,588,408 B1* | 3/2017 | Linnell | G03B 21/14 |
| 9,664,376 B2* | 5/2017 | Abe | G03B 21/204 |
| 9,769,439 B2* | 9/2017 | Toyooka | G03B 21/006 |
| 9,843,781 B1 | 12/2017 | Furui | |
| 10,080,003 B2* | 9/2018 | Tone | H04N 9/3161 |
| 10,321,104 B2* | 6/2019 | Ma | H04N 9/3152 |
| 10,516,864 B2 | 12/2019 | Otani | |
| 2005/0094110 A1 | 5/2005 | Nakamura | H04N 5/74 |
| | | | 353/85 |
| 2007/0252955 A1* | 11/2007 | Asai | G03B 21/53 |
| | | | 353/69 |
| 2009/0027571 A1* | 1/2009 | Amano | H04N 9/3185 |
| | | | 348/744 |
| 2010/0134643 A1 | 6/2010 | Koishi | |
| 2010/0135534 A1 | 6/2010 | Weston et al. | |
| 2011/0299044 A1* | 12/2011 | Yeh | H04N 9/315 |
| | | | 353/52 |
| 2011/0304833 A1 | 12/2011 | Osaka et al. | |
| 2012/0069415 A1* | 3/2012 | Freeman | G02B 26/085 |
| | | | 359/202.1 |
| 2012/0113107 A1* | 5/2012 | Jang | H04N 13/324 |
| | | | 345/419 |
| 2012/0182307 A1 | 7/2012 | Ueno et al. | |
| 2013/0244733 A1 | 9/2013 | Ueno et al. | |
| 2014/0192331 A1* | 7/2014 | Toyooka | G03B 21/006 |
| | | | 353/85 |
| 2014/0293243 A1 | 10/2014 | Furui | |
| 2015/0015730 A1 | 1/2015 | Choi et al. | |
| 2015/0350615 A1 | 12/2015 | Ono | |
| 2016/0173840 A1 | 6/2016 | Kurakake | |
| 2016/0351133 A1* | 12/2016 | Kim | G09G 3/3406 |
| 2017/0068153 A1* | 3/2017 | Ikeura | G03B 21/147 |
| 2017/0208307 A1 | 7/2017 | Ichieda et al. | |
| 2017/0229099 A1* | 8/2017 | Mito | G09G 5/10 |
| 2018/0091784 A1* | 3/2018 | Dutton | H04N 9/3129 |
| 2018/0143443 A1* | 5/2018 | Fujita | G03B 17/54 |
| 2018/0226055 A1* | 8/2018 | Raymann | G09G 3/2003 |
| 2020/0081329 A1* | 3/2020 | Cheng | H04N 5/74 |
| 2020/0177855 A1 | 6/2020 | Miao et al. | |

* cited by examiner

PROJECTOR AND BRIGHTNESS ADJUSTING METHOD

CROSS-REFERENCE TO RELATED APPLICATION

This application claims the priority benefit of China application serial no. 201811454301.6, filed on Nov. 30, 2018. The entirety of the above-mentioned patent application is hereby incorporated by reference herein and made a part of this specification.

BACKGROUND OF THE INVENTION

Field of the Invention

The invention relates to a projector and a brightness adjusting method; more particularly, the invention relates to a projector capable of automatically adjusting a brightness of the projector to a proper level for users to watch according to an image size of a projected image.

Description of Related Art

In general, the greater the brightness of projectors, the more welcome the projectors to the average users. However, if a projector with high brightness is used to project an image on a small projection screen while performing the above operation in an environment where the light is turned off, it is easy to cause eye fatigue of the user or even damages to the eyes of the user due to excessive brightness of the projection screen. For instance, the projector at home is in a home theater mode.

People are often confused by the concept of lumen and brightness. Lumen is the unit of luminous flux and a measure of total quantity of radiated light per unit time, and can also be understood as the number of photons emitted by a light source per unit time. Brightness is the perception elicited by the brightness of a target and can be defined as a light emitting intensity per unit area. The unit of brightness is nit. One nit equals one candela per square meter (1 nit=1 $cd/m^2$). The user perceives the brightness of the projector through the reflected image on a projection plane. For instance, when the projector projects a video beam with a fixed luminous flux of 3000 lumens onto projected images of different sizes, the closer the projection distance, the smaller the projected image size and the greater the brightness of the projected image. By contrast, the farther the projection distance, the greater the projected image size and the less the brightness of the projected image.

The reference value of the brightness of the normal liquid crystal displays or liquid crystal screens is about 500 nits. However, if a user uses a 3000-lumen projector, the brightness of the projected image is often far greater than 500 nits, unless the image size of the projected image is significant (e.g., greater than 80"). This causes eye fatigue of the user or even damages to the eyes of the user. Table 1 shows the brightness of the 3000-lumen projector when the projected image is of different sizes.

TABLE 1

| Image Size (inch) | Brightness (nit) |
| --- | --- |
| 10" | 32937 |
| 20" | 8233 |
| 30" | 3659 |
| 40" | 2058 |
| 50" | 1317 |
| 60" | 914 |
| 70" | 672 |
| 80" | 515 |
| 90" | 407 |
| 100" | 329 |

Accordingly, people skilled in the pertinent art are endeavored to learn how to automatically reduce the brightness of the projector while the projected image is excessively bright.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be solved by one or more embodiments of the invention was acknowledged by people of ordinary skill in the pertinent art.

SUMMARY OF THE INVENTION

The invention provides a projector and a brightness adjusting method for automatically reducing the brightness of the projector to a proper level for users to watch while the projected image is excessively bright.

Other advantages can be further illustrated by the technical features broadly embodied and described as follows.

In order to achieve one or a portion of or all of the objectives or other objectives, an embodiment of the invention provides a projector including a distance sensor, a light source, a brightness controlling circuit, and a processor. The distance sensor is configured to detect a distance between the projector and a projection plane. The light source is configured to provide an illumination beam, and the brightness controlling circuit is configured to control the light source. The processor is coupled to the distance sensor, the light source, and the brightness controlling circuit. The processor calculates according to the distance to obtain an image size of a projected image on the projection plane and instructs the light source to adjust a luminous flux of the illumination beam according to the image size of the projected image for generating a target brightness value of the projected image.

Here, the brightness of the projector provided herein is adjusted and maintained to allow users to comfortably watch images with proper brightness. In order to achieve one or a portion of or all of the objectives or other objectives, an embodiment of the invention provides a brightness adjusting method adapted to a projector, and the brightness adjusting method includes: detecting by a distance sensor a distance between the projector and a projection plane; calculating by a processor according to the distance to obtain an image size of a projected image on the projection plane; instructing by the processor the light source to adjust a luminous flux of the illumination beam according to the image size of the projected image for generating a target brightness value of the projected image.

In view of the above, according to the projector and the brightness adjusting method provided in one or more embodiments of the invention, the distance between the projector and the projection plane is detected, the image size of the projected image is calculated according to the distance, and the luminous flux of the illumination beam is adjusted according to the image size, so as to generate the target brightness value of the projected image suitable for the user.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
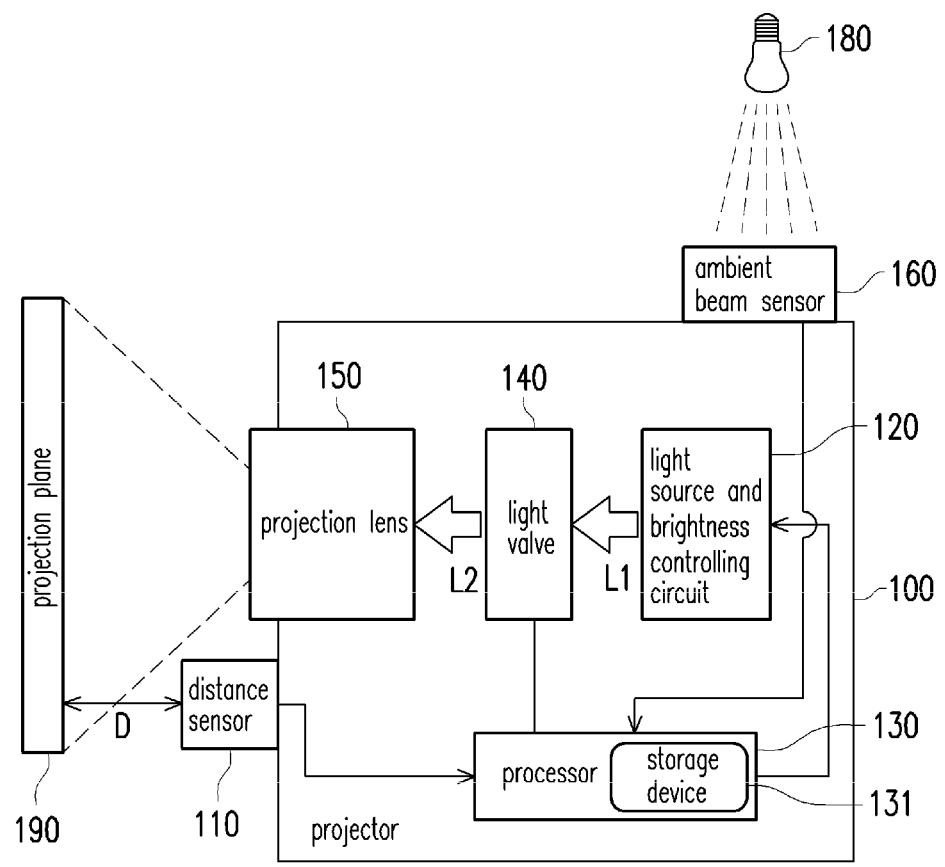
FIG. 1 is a block view of a projector according to an embodiment of the invention.
Figure 2:
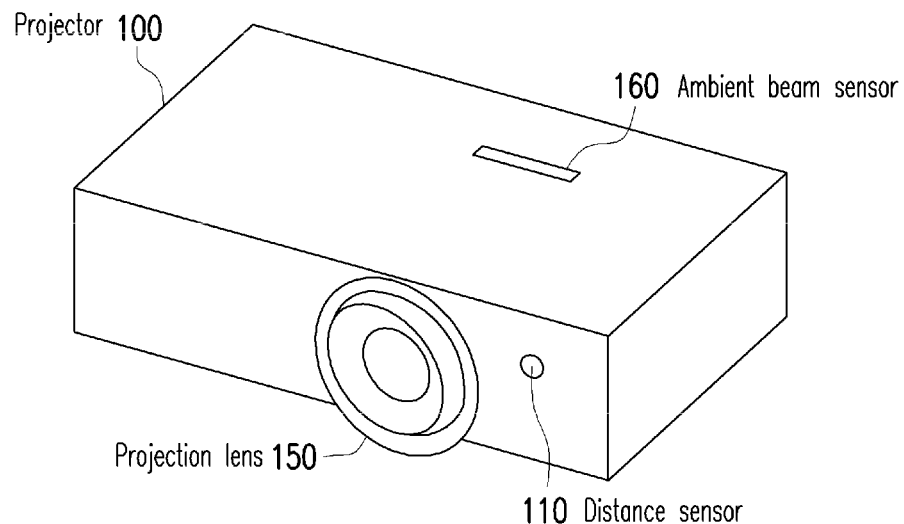
FIG. 2 is a schematic view of a projector according to an embodiment of the invention.

FIG. 1 is a block view of a projector according to an embodiment of the invention. FIG. 2 is a schematic view of a projector according to an embodiment of the invention.

With reference to FIG. 1 and FIG. 2, a projector 100 provided in an embodiment of the invention includes a distance sensor 110, a light source and brightness controlling circuit 120, and a processor 130. The processor 130 is coupled (electrically connected) to the distance sensor 110 as well as the light source and brightness controlling circuit 120. The distance sensor 110 can detect a distance D between the distance sensor 110 and a projection plane 190. That is, the distance sensor 110 is able to detect the distance D between the projector 100 and the projection plane 190. The distance sensor 110 is, for instance, a proximity sensor. Besides, the distance sensor 110 can detect the distance with use of infrared ray, laser, ultrasonic wave, sound wave, photoelectric sensing, and so on, which should not be construed as a limitation to the invention. In the light source and brightness controlling circuit 120, the light source is, for instance, a lamp, a light-emitting diode (LED), a laser beam source, or any other similar light-emitting component. The brightness controlling circuit is a known circuit configured to provide a current to the light source, so as to control the output luminous flux of the light source. The brightness controlling circuit is controlled by the processor 130 and configured to adjust the luminous flux of an illumination beam L1 output by the light source. The processor 130 is, for instance, a microprocessor control unit (MCU) or any other similar component. The processor 130 may instruct the light source and brightness controlling circuit 120 to adjust the luminous flux of the illumination beam L1. The light valve 140 can be configured to modulate the illumination beam L1. If an image signal source (e.g., a computer or smart phone outside the projector) transmits an image signal to the projector 100, and the image signal is input to the light valve 140 through the processor 130, the light valve 140 converts the illumination beam L1 into an image beam L2. The image beam L2 is projected to the projection plane 190 through a projection lens 150. The projection plane 190 is a projection screen or a wall. The projector 100 can include an ambient beam sensor 160 configured to sense an ambient beam emitted by an ambient light source 180 and transmit a numeral value corresponding to the brightness of the ambient beam to the processor 130.

Figure 3:
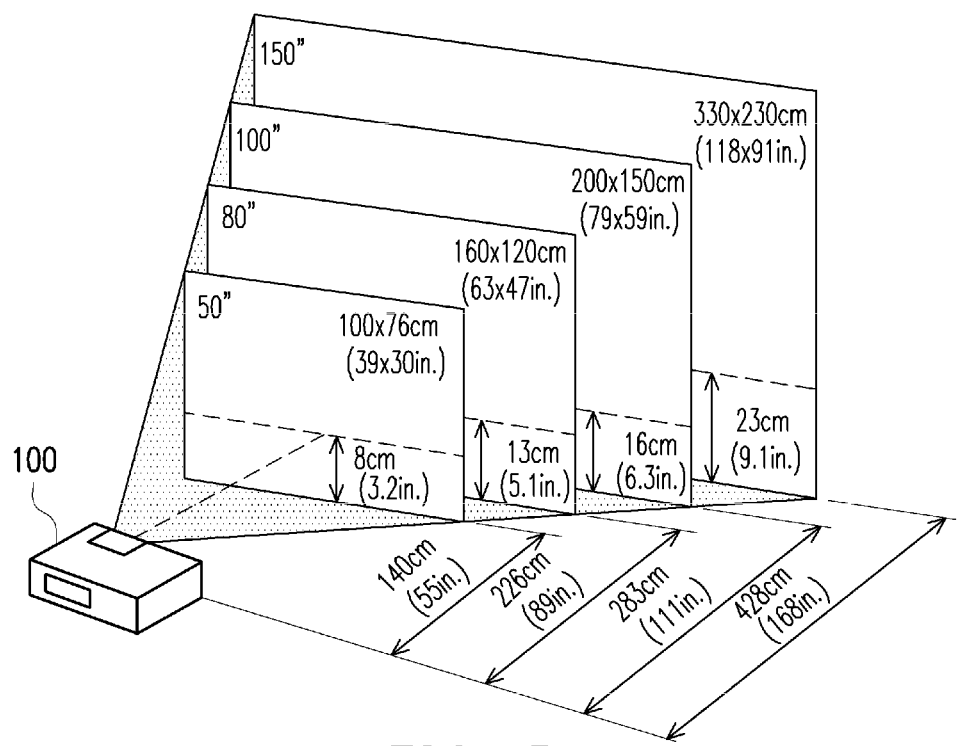
FIG. 3 is a schematic view of a projection distance and an image size of a projected image according to an embodiment of the invention.

In an embodiment, the processor 130 calculates according to the distance D and obtains the image size of the projected image on the projection plane 190. Specifically, the processor 130 calculates the size of the projected image according to the distance D, a throw ratio predetermined by the projector 100, and a length-width ratio predetermined by the projector 100. FIG. 3 is a schematic view of a projection distance and an image size of a projected image according to an embodiment of the invention. With reference to FIG. 3, for instance, the image size of the projected image is 50", and when the distance sensor 110 detects that the distance D=140 cm, the processor 130 may calculate to obtain the length and the width of the projected image as 100 cm and 76 cm according to the default/predetermined throw ratio 1.41 and the length-width ratio 4:3 predetermined by the projector 100; according to the length and the width of the projected image, the processor 130 can further calculate to learn that the length of a diagonal of the projected image is 50". The throw ratio is a ratio of a projection distance to the length of the projected image, and the length-width ratio of the projected image is a ratio of the length to the width of the projected image. Note that 8 cm, 13 cm, 16 cm, and 23 cm shown in FIG. 3 can be changed together with changes to the included angle between the optical axis of the projector 100 and the horizontal plane.

After the processor 130 calculates the image size corresponding to the distance D, the processor 130 instructs the light source and brightness controlling circuit 120 to adjust the luminous flux of the illumination beam L1 according to the image size of the projected image for generating a predetermined target brightness value of the projected image (e.g., 515 nits comfortable to users).

In an embodiment, the processor 130 obtains a first brightness value of the projected image by looking up the image size and the luminous flux of the illumination beam L1 of the light source and brightness controlling circuit 120 in the lookup table. When the first brightness value is greater than a predetermined brightness value (e.g., 515 nits), the processor 130 instructs the light source and brightness controlling circuit 120 to reduce the luminous flux of the illumination beam L1 according to a ratio change way, so that a difference between the target brightness value of the projected image and the predetermined brightness value is less than an error value. In an embodiment, the processor 130 obtains the first brightness value of the projected image by looking up the image size and the luminous flux of the illumination beam L1 of the light source and brightness controlling circuit 120 in the lookup table. When the first brightness value is less than or approximately equal to the predetermined brightness value (e.g., 515 nits), the processor 130 does not instruct the light source and brightness controlling circuit 120 to reduce the luminous flux. The lookup table can be stored in the storage device 131. The storage device 131 is, for instance, an electrically-erasable programmable read-only memory (EEPROM) or any other similar component and can be installed in the processor 130 or arranged outside the processor 130 and coupled to the processor 130. Table 2 is an exemplary lookup table.

TABLE 2

(the luminous flux is 3000, for instance)

| Image Size | Luminous Flux | First Brightness Value | Ratio Change Way | Target Brightness Value |
|---|---|---|---|---|
| 10" | 3000 | 32937 | 1/64 | 515 |
| 20" | 3000 | 8233 | 1/16 | 515 |
| 30" | 3000 | 3659 | 1/5.1 | 515 |
| 40" | 3000 | 2058 | 1/4 | 515 |
| 50" | 3000 | 1317 | 1/2.56 | 514 |
| 60" | 3000 | 914 | 1/1.78 | 513 |
| 70" | 3000 | 672 | 1/1.3 | 515 |
| 80" | 3000 | 515 | 1/1 | 515 |
| 90" | 3000 | 407 | Not Adjusted | 407 |
| 100" | 3000 | 329 | Not Adjusted | 329 |

In an embodiment, through the image size and the luminous flux of the illumination beam L1 of the light source input to the calculation formula, the processor 130 calculates and obtains the first brightness value of the projected image. When the first brightness value is greater than the predetermined brightness value, the processor 130 instructs the light source and brightness controlling circuit 120 to reduce the luminous flux according to the ratio change way, so that the difference between the target brightness value of the projected image and the predetermined brightness value is less than the error value. For instance, the processor 130 can execute the firmware stored in the storage device 131, so as to calculate and obtain the first brightness value of the projected image through the image size and the luminous flux of the illumination beam L1 of the light source input to the calculation formula in the firmware. If the image size is 10", and the luminous flux is 3000, for instance, the first brightness value calculated by the processor 130 is 32937. Since the first brightness value (i.e., 32937) is greater than the predetermined brightness value, the processor 130 instructs the light source and brightness controlling circuit 120 to reduce the luminous flux (by 64 times the original luminous flux) according to the ratio change way (e.g., 1/64), so that the difference between the target brightness value (515 nits) of the projected image and the predetermined brightness value (515 nits) is less than the error value. Table 2 is taken as an example, and it can be learned that the error value is approximately (515−513)/515×100%=0.4%, but the invention is not limited thereto. In other embodiments, the error value can be set to be equal to or less than 1%.

In an embodiment, the light source in the light source and brightness controlling circuit 120 is, for instance, a solid-state light source or a lamp. When the light source is the solid-state light source, the light source and brightness controlling circuit 120 adjusts the luminous flux by adjusting a current or a duty cycle and a color sequence. When the light source is the lamp, the light source and brightness controlling circuit 120 adjusts the luminous flux by adjusting the number of watts and the color sequence.

In an embodiment, the processor 130 obtains a brightness of an ambient beam through the ambient beam sensor 160. If the brightness of the ambient beam is greater than a first valve value, the processor 130 instructs the light source and brightness controlling circuit 120 to increase the luminous flux of the illumination beam L1 according to the brightness of the ambient beam. If the brightness of the ambient beam is less than a second valve value, the processor 130 instructs the light source and brightness controlling circuit 120 to decrease the luminous flux according to the brightness of the ambient beam. The first valve value is greater than the second valve value. For instance, if a proper brightness of the ambient beam is 100 nits, the first valve value is 120 nits, and the second valve value is 80 nits. When the brightness of the ambient beam is 150 nits, the processor 130 instructs the light source and brightness controlling circuit 120 to increase the luminous flux of the illumination beam, so that the brightness of the projected image can be increased by 50 nits (i.e., 150 nits−100 nits=50 nits) for offsetting the impact of the ambient beam and improving visibility. When the brightness of the ambient beam is 70 nits, the processor 130 instructs the light source and brightness controlling circuit 120 to decrease the luminous flux of the illumination beam, so that the brightness of the projected image can be decreased by 30 nits (i.e., 100 nits−70 nits=30 nits). Certainly, the increased or decreased brightness of the ambient beam may be multiplied by a predetermined parameter to obtain a better user experience. In an embodiment, the projector 100 may be equipped with a color sensor next to an optical path to sense the color temperature of the illumination beam L1 and/or the image beam L2, so that the illumination beam L1 and/or the image beam L2 can have the same color temperature after the luminous flux is increased or decreased. During a process of correcting the color temperature, the brightness and the color table of each display mode can be simultaneously established, and the color table can be stored in a storage device 130. Through the ambient beam sensor 160, smart brightness adjustment can be achieved, and the function of smart brightness adjustment can be performed on the menu of an on screen display (OSD) for users to select "on" or "off".

Figure 4:
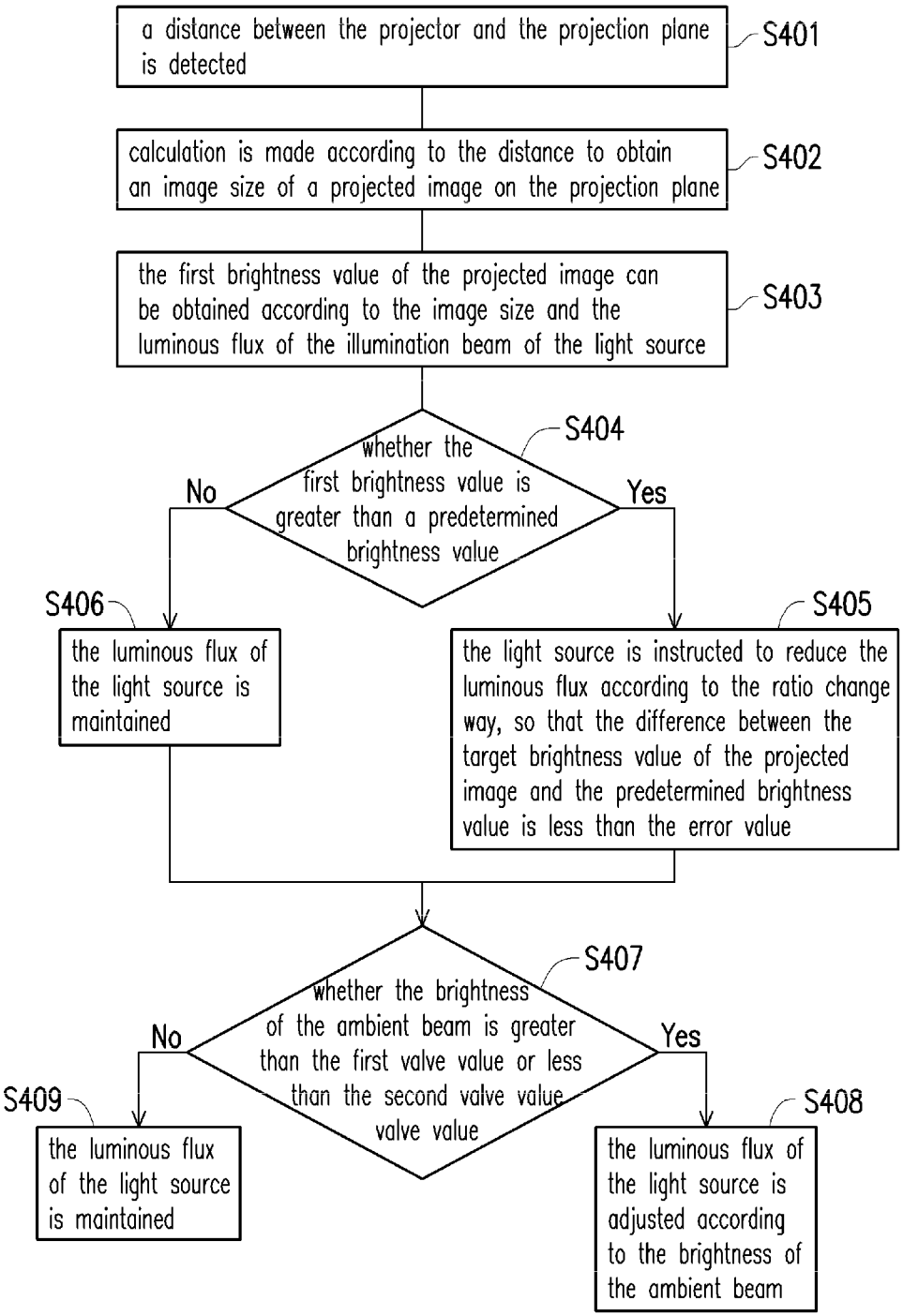
FIG. 4 is a flowchart illustrating a brightness adjusting method according to an embodiment of the invention.

FIG. 4 is a flowchart illustrating a brightness adjusting method according to an embodiment of the invention.

With reference to FIG. 4, in step S401, a distance between the projector and the projection plane is detected.

In step S402, calculation is made according to the distance to obtain an image size of a projected image on the projection plane.

In step S403, according to the image size and the luminous flux of the illumination beam of the light source, the first brightness value of the projected image can be obtained.

In step S404, it is determined whether the first brightness value is greater than a predetermined brightness value.

If the first brightness value is greater than the predetermined brightness value, in step S405, the light source is instructed to reduce the luminous flux according to the ratio change way, so that the difference between the target brightness value of the projected image and the predetermined brightness value is less than the error value.

If the first brightness value is less than or approximately equal to the predetermined brightness value, in step S406, the luminous flux of the light source is maintained.

In step S407, it is determined whether the brightness of the ambient beam is greater than the first valve value or less than the second valve value.

If the brightness of the ambient beam is greater than the first valve value or less than the second valve value, in step S408, the luminous flux of the light source is adjusted according to the brightness of the ambient beam.

If the brightness of the ambient beam is less than or equal to the first valve value and is greater than or equal to the second valve value, in step S409, the luminous flux of the light source is maintained.

To sum up, according to the projector and the brightness adjusting method provided in one or more embodiments of the invention, the distance between the projector and the projection plane is detected, the image size of the projected image is calculated according to the distance, and the luminous flux of the illumination beam is adjusted according to the image size, so as to generate the target brightness value of the projected image suitable for the user. Besides, according to the projector and the brightness adjusting method provided in one or more embodiments of the invention, the luminous flux can be adjusted according to the brightness of the ambient beam. Accordingly, by using the projector or applying the brightness adjusting method provided in one or more embodiments of the invention, eye fatigue of the user or damages to the eyes of the user can be prevented, energy can be saved, and the life span of the projector can be extended.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the invention is provided to comply with the rules requiring an abstract, which will allow a searcher to quickly ascertain the subject matter of the technical invention of any patent issued from this invention. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present invention is intended to be dedicated to the public regardless of whether the element or component is explicitly recited in the following claims.

What is claimed is:

1. A projector comprising: a distance sensor, a light source, a brightness controlling circuit, and a processor, wherein the distance sensor is configured to detect a distance between the projector and a projection plane, the light source is configured to emit an illumination beam, the brightness controlling circuit is configured to control the light source, and the processor is coupled to the distance sensor, the light source, and the brightness controlling circuit, wherein the processor calculates according to the distance to obtain an image size of a projected image on the projection plane and instructs the light source to adjust a luminous flux of the illumination beam according to the image size of the projected image for generating a target brightness value of the projected image, wherein the projector further comprises a storage device couple with the processor, the storage device comprises a lookup table, the processor obtains a first brightness value of the projected image by looking up the image size and the luminous flux of the illumination beam of the light source in the lookup table, and when the first brightness value is greater than a predetermined brightness value, the processor instructs the light source to reduce the luminous flux of the illumination beam according to a ratio change way, so that a difference between the target brightness value of the projected image and the predetermined brightness value is less than an error value.

2. The projector according to claim 1, further comprising: an ambient beam sensor coupled to the processor, wherein the processor obtains a brightness of an ambient beam through the ambient beam sensor, when the brightness of the ambient beam is greater than a first valve value, the processor instructs the light source to increase the luminous flux of the illumination beam according to the brightness of the ambient beam for offsetting the brightness of the ambient beam, when the brightness of the ambient beam is less than a second valve value, the processor instructs the light source to decrease the luminous flux of the illumination beam according to the brightness of the ambient beam, and the first valve value is greater than the second valve value.

3. The projector according to claim 2, wherein when the brightness of the ambient beam is between the first valve value and the second valve value, the processor does not instruct the light source to adjust the luminous flux of the illumination beam.

4. The projector according to claim 1, wherein the processor calculates the image size according to the distance, a throw ratio of the projector, and a length-width ratio of the projected image.

5. The projector according to claim 1, wherein the light source is a solid-state light source, and the light source adjusts a current or a duty cycle and a color sequence through the brightness control circuit, so as to adjust the luminous flux of the illumination beam.

6. The projector according to claim 1, wherein the light source is a lamp, and the light source adjusts the number of watts and a color sequence through the brightness control circuit, so as to adjust the luminous flux of the illumination beam.

7. A projector comprising: a distance sensor, a light source, a brightness controlling circuit, and a processor, wherein the distance sensor is configured to detect a distance between the projector and a projection pane, the light source is configured to emit an illumination beam, the brightness controlling circuit is configured to control the light source, and the processor is coupled to the distance sensor, the light source, and the brightness controlling circuit, wherein the processor calculates according to the distance to obtain an image size of a projected image on the projection plane and instructs the light source to adjust a luminous flux of the illumination beam according to the image size of the projected image for generating a target brightness value of the projected image, wherein the processor comprises a calculation formula, and through the image size and the luminous flux of the illumination beam of the light source input to the calculation formula, the processor calculates and obtains a first brightness value of the projected image, when the first brightness value is greater than a predetermined brightness value, the processor instructs the light source to reduce the luminous flux of the illumination beam according to a ratio change way, so that a difference between the target brightness value of the projected image and the predetermined brightness value is less than an error value.

8. A brightness adjusting method adapted to a projector, the method comprising:

detecting by a distance sensor a distance between the projector and a projection plane; and calculating by a processor according to the distance to obtain an image size of a projected image on the projection plane and instructing by the processor the light source to adjust a luminous flux of the illumination beam according to the image size of the projected image for generating a target brightness value of the projected image, wherein the projector further comprises a storage device coupled with the processor, the storage device the processor comprises a lookup table, the processor obtains a first brightness value of the projected image by looking up the image size and the luminous flux of the illumination beam of the light source in the lookup table, and when the first brightness value is greater than a predetermined brightness value, the processor instructs the light source to reduce the luminous flux of the illumination beam according to a ratio change way, so that a difference between the target brightness value of the projected image and the predetermined brightness value is less than an error value.

9. The brightness adjusting method according to claim 8, further comprising:

obtaining by the processor a brightness of am ambient beam through the ambient beam sensor, when the brightness of the ambient beam is greater than a first valve value, the processor instructs the light source to increase the luminous flux of the illumination beam according to the brightness of the ambient beam, when the brightness of the ambient beam is less than a second valve value, the processor instructs the light source to decrease the luminous flux of the illumination beam according to the brightness of the ambient beam, and the first valve value is greater than the second valve value.

10. The brightness adjusting method according to claim 9, wherein when the brightness of the ambient beam is between the first valve value and the second valve value, the processor does not instruct the light source to adjust the luminous flux of the illumination beam.

11. The brightness adjusting method according to claim 8, wherein the processor calculates the image size according to the distance, a throw ratio of the projector, and a length-width ratio of the projected image.

12. The brightness adjusting method according to claim 8, wherein the light source is a solid-state light source, and the light source adjusts a current or a duty cycle and a color sequence through the brightness control circuit, so as to adjust the luminous flux of the illumination beam.

13. The brightness adjusting method according to claim 8, wherein the light source is a lamp, and the light source adjusts the number of watts and a color sequence through the brightness control circuit, so as to adjust the luminous flux of the illumination beam.

14. A brightness adjusting method adapted to a projector, the method comprising:

detecting by a distance sensor a distance between the projector and a projection plane; and calculating by a processor according to the distance to obtain an image size of a projected image on the projection plane and instructing by the processor the light source to adjust a luminous flux of the illumination beam according to the image size of the projected image for generating a target brightness value of the projected image, wherein the processor comprises a calculation formula, and through the image size and the luminous flux of the illumination beam of the light source input to the calculation formula the processor calculates and obtains a first brightness value of the projected image, when the first brightness value is greater than a predetermined brightness value, the processor instructs the light source to reduce the luminous flux of the illumination beam according to a ratio change way, so that a difference between the target brightness value of the projected image and the predetermined brightness value is less than an error value.

* * * * *